E. C. LEAMAN.
LAWN WEEDER.
APPLICATION FILED JAN. 31, 1917.
1,244,344.
Patented Oct. 23, 1917.
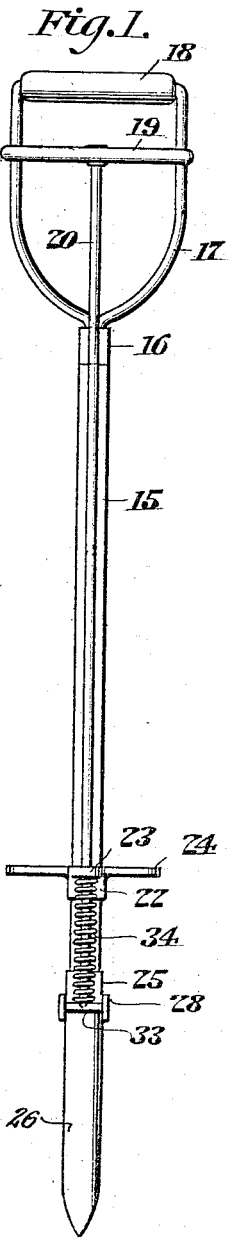
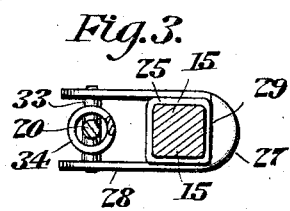
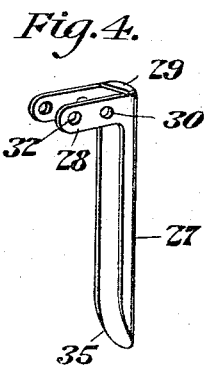
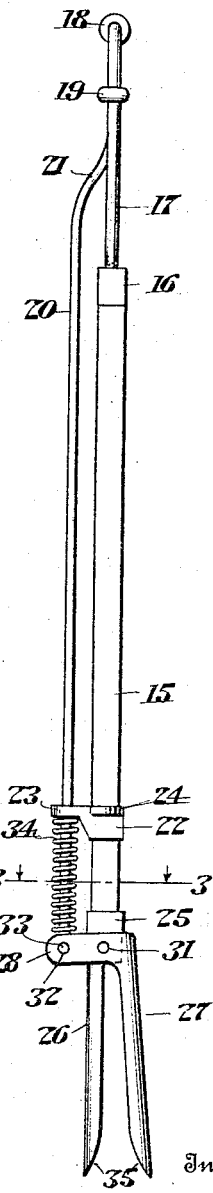
Inventor
E. C. Leaman
By Victor J. Evans
Attorney
Witness

UNITED STATES PATENT OFFICE.

ELWOOD C. LEAMAN, OF HARRISBURG, PENNSYLVANIA.

LAWN-WEEDER.

1,244,344.

Specification of Letters Patent.

Patented Oct. 23, 1917.

Application filed January 31, 1917. Serial No. 145,727.

*To all whom it may concern:*

Be it known that I, ELWOOD C. LEAMAN, a citizen of the United States, residing at Harrisburg, in the county of Dauphin and State of Pennsylvania, have invented new and useful Improvements in Lawn-Weeders, of which the following is a specification.

This invention relates to lawn weeders, and it has for its object to produce a simple, inexpensive and effective device whereby weeds and noxious plants may be extracted from the soil and completely eradicated.

A further object of the invention is to produce a device of the character specified which will be simple in construction and easily operated.

With these and other ends in view which will readily appear as the nature of the invention is better understood, the same consists in the improved construction and novel arrangement and combination of parts which will be hereinafter fully described and particularly pointed out in the claims.

In the accompanying drawing has been illustrated a simple and preferred form of the invention, it being, however, understood that no limitation is necessarily made to the precise structural details therein exhibited, but that changes, alterations and modifications within the scope of the claims may be resorted to when desired.

In the drawing,—

Figure 1 is a front view of a device constructed in accordance with the invention.

Fig. 2 is a side view of the same.

Fig. 3 is a horizontal sectional view taken on the line 3—3 in Fig. 2.

Fig. 4 is a perspective view showing the movable blade detached.

Corresponding parts in the several figures are denoted by like characters of reference.

A rod or staff 15 is provided at its upper end with a ferrule or socket 16 with which a handle is connected, said handle being composed of side members or horns 17 and a cross piece or grip member 18. The horns 17 have vertical portions on which is slidably guided a cross bar 19 with which is connected the upper end of a rod 20, said rod having an intermediate shoulder 21 forming an offset whereby the lower portion of said rod is located adjacent to one side of the rod or staff 15. Fixed on the rod or staff 15 near the lower end thereof is a clip 22 having an arm 23 through which the rod 20 is guided. Said clip 22 is also provided with laterally extending flanges 24 constituting foot pieces. Fixed on the lower extremity of the rod or staff 15 is a socket 25 having a downwardly extending blade 26 of arcuate cross section. The blade 26 constitutes what may be termed the stationary blade of the device.

The movable blade 27 which in Fig. 4 has been shown detached is of arcuate cross section, and it is provided at its upper end with parallel arms 28 and with a flange 29, said flange being formed at the upper extremity of the arcuate portion of the blade and extending between the arms 28 so as to form a shoulder or offset. The arms 28 are apertured near their inner ends, as seen at 30 in Fig. 4, for the passage of a pivot member 31, see Fig. 2, which also extends through the socket 25 and serves to connect the latter with the rod or staff 15. The arms 28 are also apertured near their outer ends, as seen at 32, for the passage of a connecting member, such as a bolt or pin 33, with which the lower end of the rod 20 is connected. A spring 34 is coiled about the rod 20 between the arm 23 and the pin or bolt 33, thereby exerting pressure on the arms 28 of the movable blade, whereby the lower extremity of said blade is swung outward with respect to the stationary blade 26, the outward movement being, however, limited by contact of the flange or shoulder 29 with the socket member 25, the stationary and movable blades 26 and 27 being thereby maintained in approximately parallel relation. The lower extremities of the blades may be sharpened, and they have also been shown as being beveled on their opposed faces, as indicated at 35, the points thus formed serving to facilitate the forcing of the blades into the ground.

In operation, the blades of the tool are forced into the ground in such a manner as to lie adjacent to opposite sides of the root of the weed or plant that is to be extracted. In thus forcing the blades into the ground the tool may be manipulated by the handle or cross bar 18, and the operator may place either foot on one of the laterally extending flanges 24 of the clip member 22. By forming these flanges or foot pieces on both sides of the clip member 22, the operator may use either foot, and the implement may be turned to present either side to the operator. After forcing the blades into the ground, the operator with his fingers engages the cross bar 19, pulling the latter upward in the direction of the cross bar 18 which is engaged by the palm of the hand, and exerting an upward pull on the rod 20, thereby rocking the movable blade about the axis of the pivot member 31 against the tension of the spring 34, so as to bring the lower extremities of the two blades closely together, thus firmly gripping the root of the weed which may now be readily lifted or extracted. The improved device, as will be seen, is simple in construction, and it may be conveniently and effectively used without stooping or other strenuous exertion.

Having thus described the invention, what is claimed as new, is:—

1. In a device of the class described, a staff having a handle at its upper end, and a stationary blade at its lower end, a slidable cross bar guided on the handle, a movable blade having laterally extending arms, a pivot member connecting said arms with the staff at the lower end thereof, and a rod connecting the arms of the blade with the slidable cross bar, said staff having a clip member provided with an arm through which the connecting rod is guided and with oppositely extending flanges forming foot pieces.

2. A structure as specified in claim 1; a spring being coiled about the operating rod between the arms of the clip member and the arms of the movable blade.

In testimony whereof I affix my signature.

ELWOOD C. LEAMAN.